United States Patent
Polasa et al.

(10) Patent No.: US 12,361,430 B2
(45) Date of Patent: Jul. 15, 2025

(54) SYSTEM FOR DYNAMIC DATA ENCRYPTION IN AN ACTIVE NETWORK SESSION

(71) Applicant: BANK OF AMERICA CORPORATION, Charlotte, NC (US)

(72) Inventors: Puneetha Polasa, Telangana (IN); Sandeep Kumar Chauhan, Miyapur Hyderabad (IN); Bhagya Lakshmi Sudha Lavanya Mallidi, Hyderabad (IN); Udaya Kumar Raju Ratnakaram, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 265 days.

(21) Appl. No.: 17/848,459

(22) Filed: Jun. 24, 2022

(65) Prior Publication Data

US 2023/0419329 A1  Dec. 28, 2023

(51) Int. Cl.
*G06Q 20/40* (2012.01)
*G06Q 20/38* (2012.01)
*H04L 9/40* (2022.01)

(52) U.S. Cl.
CPC ..... *G06Q 20/40975* (2013.01); *G06Q 20/382* (2013.01); *H04L 63/0428* (2013.01); *H04L 63/1458* (2013.01)

(58) Field of Classification Search
CPC ............ G06Q 20/40975; G06Q 20/382; H04L 63/0428; H04L 63/1458
See application file for complete search history.

(56) References Cited

U.S. PATENT DOCUMENTS 5,995,624 A  11/1999 Fielder
7,143,289 B2  11/2006 Denning
(Continued)

FOREIGN PATENT DOCUMENTS

WO  2005057841 A1  6/2005
WO  2006038391 A1  4/2006

OTHER PUBLICATIONS

Mildrey Carbonell et al., Security Analysis of a New Multi-Party Protocol with Intermediary Service, Sep. 24, 2007, IEEE, pp. 698-702 (Year: 2007).*

*Primary Examiner* — Nilesh B Khatri
(74) *Attorney, Agent, or Firm* — Moore & Van Allen PLLC; Anup Iyer

(57) ABSTRACT

Systems, computer program products, and methods are described herein for dynamic data encryption in an active network session. The present invention is configured to initiate an active network session with a user input device; electronically receive, from the user input device, a resource transfer request from a user, wherein the resource transfer request comprises at least one or more resource transfer parameters; trigger a dynamic data encryption (DDE) engine in response to receiving the resource transfer request; generate, using the DDE engine, a digital identifier for the resource transfer request using the one or more resource transfer parameters; execute the resource transfer request using the digital identifier; transmit control signals configured to cause the user input device to display a notification indicating that the resource transfer request has been executed; and terminate the active network session.

20 Claims, 4 Drawing Sheets

(56) References Cited

U.S. PATENT DOCUMENTS

| | | | |
|---|---|---|---|
| 7,370,348 B1 | 5/2008 | Patel | |
| 8,458,468 B2 | 6/2013 | Leone | |
| 9,258,115 B2 | 2/2016 | Whitehead | |
| 10,193,872 B2 | 1/2019 | Sammet | |
| 10,832,244 B1* | 11/2020 | Chowdhury | G06Q 20/388 |
| 10,903,985 B2 | 1/2021 | Bergeron | |
| 11,120,141 B2 | 9/2021 | Krishnamurthy | |
| 11,429,971 B1* | 8/2022 | Ouellette | G06Q 20/385 |
| 11,461,776 B2* | 10/2022 | Banerjee | G06Q 20/382 |
| 11,489,666 B2 | 11/2022 | Bergeron | |
| 11,558,413 B2 | 1/2023 | Higgins | |
| 11,595,368 B2 | 2/2023 | Wu | |
| 11,625,752 B2 | 4/2023 | Sabeg | |
| 11,769,186 B2* | 9/2023 | McGregor | G06Q 30/0609 |
| | | | 705/26.35 |
| 11,770,254 B2* | 9/2023 | Rule | H04L 9/50 |
| | | | 713/155 |
| 2002/0010684 A1* | 1/2002 | Moskowitz | G06Q 20/40 |
| | | | 713/176 |
| 2007/0165849 A1 | 7/2007 | Varghese | |
| 2009/0070171 A1* | 3/2009 | Patterson | G06Q 20/385 |
| | | | 705/42 |
| 2015/0046339 A1* | 2/2015 | Wong | G06Q 20/4016 |
| | | | 705/44 |
| 2015/0142671 A1* | 5/2015 | Dicker | G06Q 20/327 |
| | | | 705/75 |
| 2015/0317748 A1* | 11/2015 | Roberts | G06Q 20/34 |
| | | | 705/30 |
| 2015/0349966 A1 | 12/2015 | Dimitrakos | |
| 2016/0203479 A1 | 7/2016 | Durant | |
| 2016/0307197 A1* | 10/2016 | Roeill | G06Q 40/04 |
| 2017/0116603 A1* | 4/2017 | Bogaard | G06Q 20/02 |
| 2019/0318325 A1* | 10/2019 | Kadiwala | G06Q 20/322 |
| 2019/0392408 A1* | 12/2019 | Ng | G06Q 20/40 |
| 2020/0380591 A1* | 12/2020 | Rule | G06Q 20/3829 |
| 2022/0343015 A1* | 10/2022 | Shahin | H04L 9/0643 |
| 2022/0374896 A1* | 11/2022 | Ma | G06Q 30/0229 |
| 2023/0385793 A1* | 11/2023 | Shmulevich | G06Q 20/3278 |
| 2024/0037513 A1* | 2/2024 | Thairu | G06Q 20/401 |
| 2024/0089292 A1* | 3/2024 | Ghosh | H04L 63/20 |
| 2024/0098141 A1* | 3/2024 | Gadwale | H04L 63/107 |
| 2024/0106669 A1* | 3/2024 | Rand | H04L 9/3297 |

* cited by examiner

SYSTEM FOR DYNAMIC DATA ENCRYPTION IN AN ACTIVE NETWORK SESSION

FIELD OF THE INVENTION

The present invention embraces a system for dynamic data encryption in an active network session.

BACKGROUND

In today's interconnected digital world, it is not uncommon for any request made during an active network session to involve multiple parties for successful execution. Each party may require particular information to aid in the execution of the resource transfer request. However, not all elements of this information are required by all the partied involved. Due to the sensitive nature of the information provided, divulging such information when not required may increase the exposure to misappropriation.

Therefore, there is a need for a system for dynamic data encryption and portioned extracted decryption for protecting information and information systems from unauthorized access, use, disclosure, disruption, modification, in order to provide integrity, confidentiality, and availability.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamic data encryption in an active network session is presented. The system comprising: at least one non-transitory storage device; and at least one processor coupled to the at least one non-transitory storage device, wherein the at least one processor is configured to: initiate an active network session with a user input device; electronically receive, from the user input device, a resource transfer request from a user, wherein the resource transfer request comprises at least one or more resource transfer parameters; trigger a dynamic data encryption (DDE) engine in response to receiving the resource transfer request; generate, using the DDE engine, a digital identifier for the resource transfer request using the one or more resource transfer parameters; execute the resource transfer request using the digital identifier; transmit control signals configured to cause the user input device to display a notification indicating that the resource transfer request has been executed; and terminate the active network session.

In some embodiments, the at least one processor is further configured to: electronically receive, from the user input device, a DDE registration request to use the DDE engine to execute one or more resource transfers; transmit control signals configured to cause the user input device to display a prompt to provide one or more user information in response to receiving the DDE registration request; receive, from the user input device, the one or more user information in response to the prompt; and register the user using the one or more user information.

In some embodiments, the at least one processor is further configured to: electronically receive, from the user input device, a request to trigger the DDE engine to execute the resource transfer request; prompt the user to provide one or more authentication credentials in response to receiving the request; electronically receive, from the user input device, the one or more authentication credentials in response to the prompt; determine that the user is registered to use the DDE engine to execute the one or more resource transfers; and trigger the DDE engine in response to determining that the user is registered to use the DDE engine.

In some embodiments, the one or more resource transfer parameters comprises at least a network session identifier, a resource transfer identifier, user information, merchant information, one or more resources, and payment information.

In some embodiments, executing the resource transfer request using the digital identifier further comprises: decrypting the digital identifier to extract a first portion of the one or more resource transfer parameters, wherein the first portion of the one or more resource transfer parameters comprises information required by a merchant to transfer the one or more resources associated with the resource transfer request to the user; transmitting the first portion of the resource transfer parameters to a merchant input device associated with the merchant; and receiving, from the merchant input device, an indication that the one or more resources associated with the resource transfer request has been transferred to the user.

In some embodiments, executing the resource transfer request using the digital identifier further comprises: decrypting the digital identifier to extract a second portion of the one or more resource transfer parameters, wherein the second portion of the one or more resource transfer parameters comprises payment information required by a payment reconciliation entity to complete payment processing and settlement; transmitting the second portion of the resource transfer parameters to a payment reconciliation device associated with the payment reconciliation entity; and receiving, from the payment reconciliation entity, an indication that the payment processing and reconciliation has been completed.

In some embodiments, the digital identifier is unique to the resource transfer request.

In another aspect, a computer program product for dynamic data encryption in an active network session is presented. The computer program product comprising a non-transitory computer-readable medium comprising code causing an apparatus to: initiate an active network session with a user input device; electronically receive, from the user input device, a resource transfer request from a user, wherein the resource transfer request comprises at least one or more resource transfer parameters; trigger a dynamic data encryption (DDE) engine in response to receiving the resource transfer request; generate, using the DDE engine, a digital identifier for the resource transfer request using the one or more resource transfer parameters; execute the resource transfer request using the digital identifier; transmit control signals configured to cause the user input device to display a notification indicating that the resource transfer request has been executed; and terminate the active network session.

In yet another aspect, a method for dynamic data encryption in an active network session is presented. The method comprising: initiating an active network session with a user input device; electronically receiving, from the user input device, a resource transfer request from a user, wherein the resource transfer request comprises at least one or more resource transfer parameters; triggering a dynamic data encryption (DDE) engine in response to receiving the resource transfer request; generating, using the DDE engine, a digital identifier for the resource transfer request using the one or more resource transfer parameters; executing the resource transfer request using the digital identifier; transmitting control signals configured to cause the user input device to display a notification indicating that the resource transfer request has been executed; and terminating the active network session.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
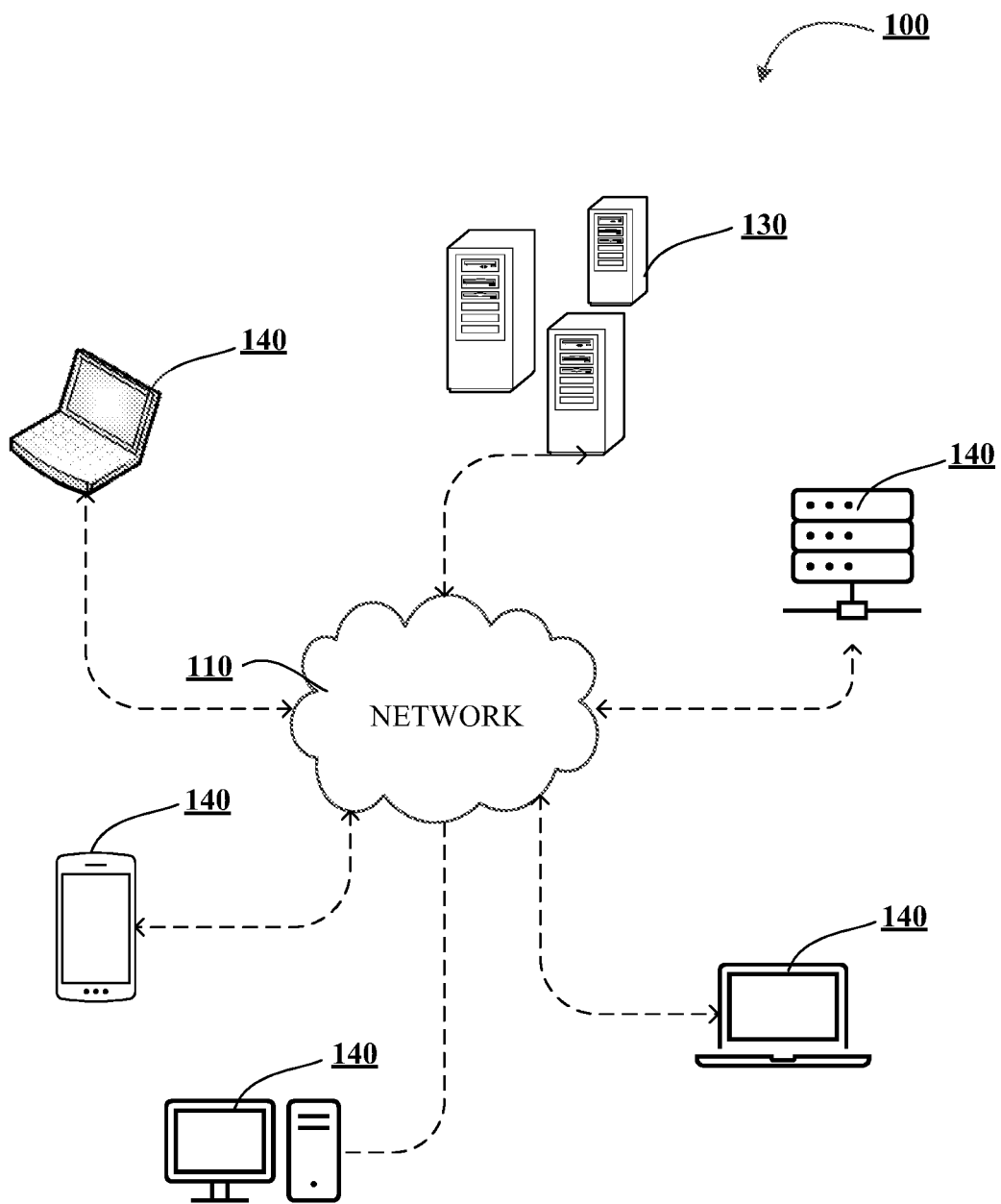
Figure 1B:
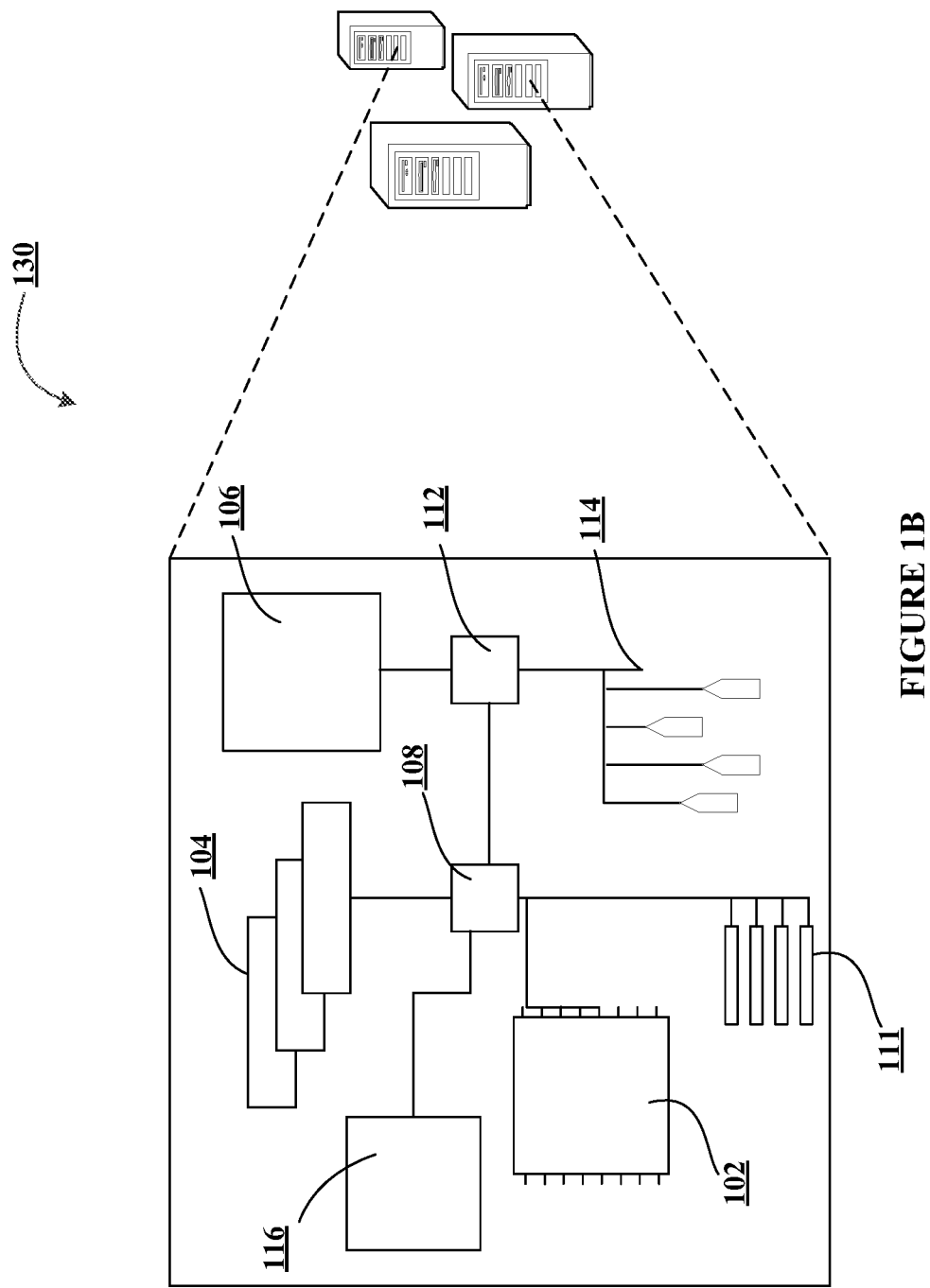
Figure 1C:
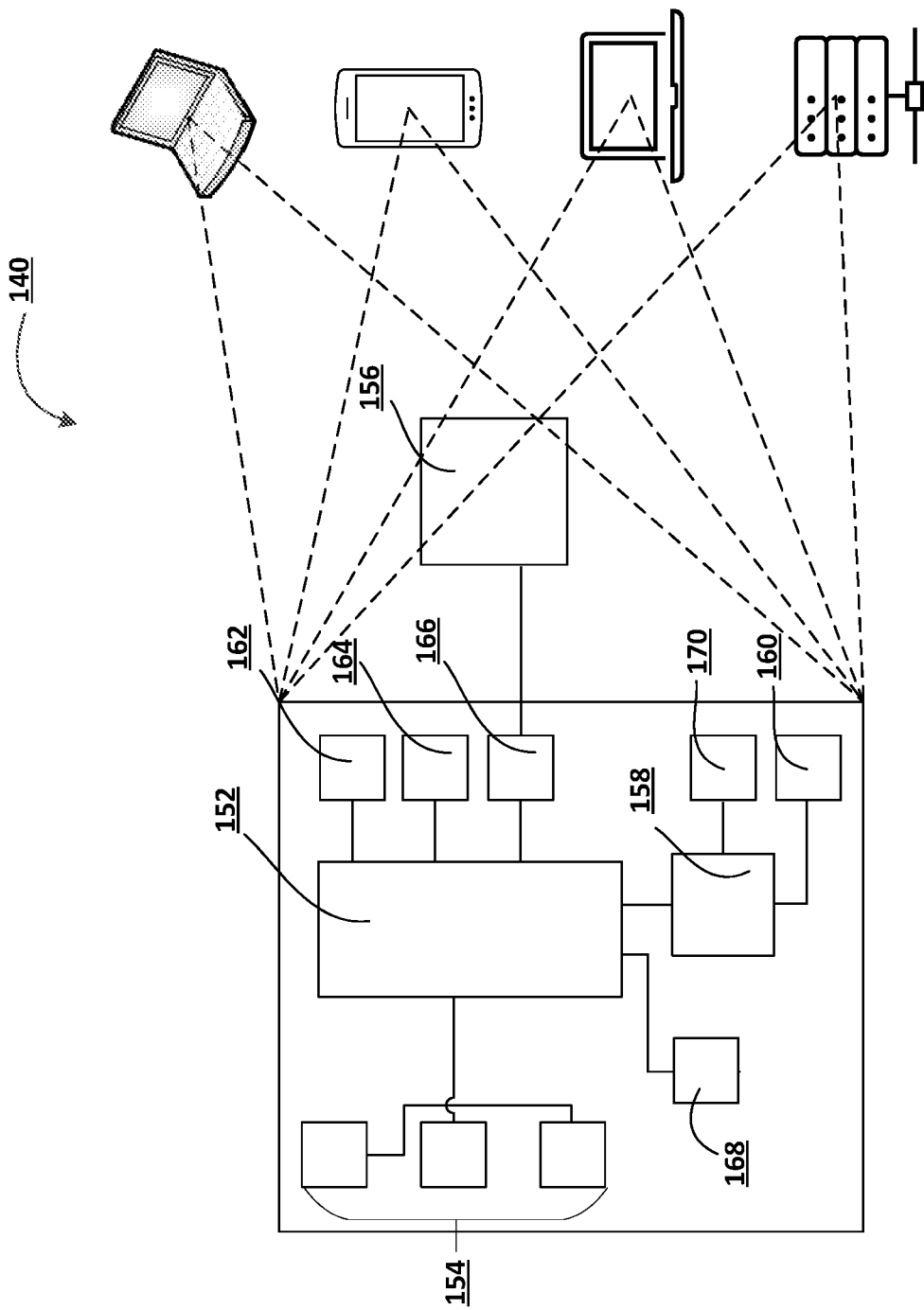
Figure 2:
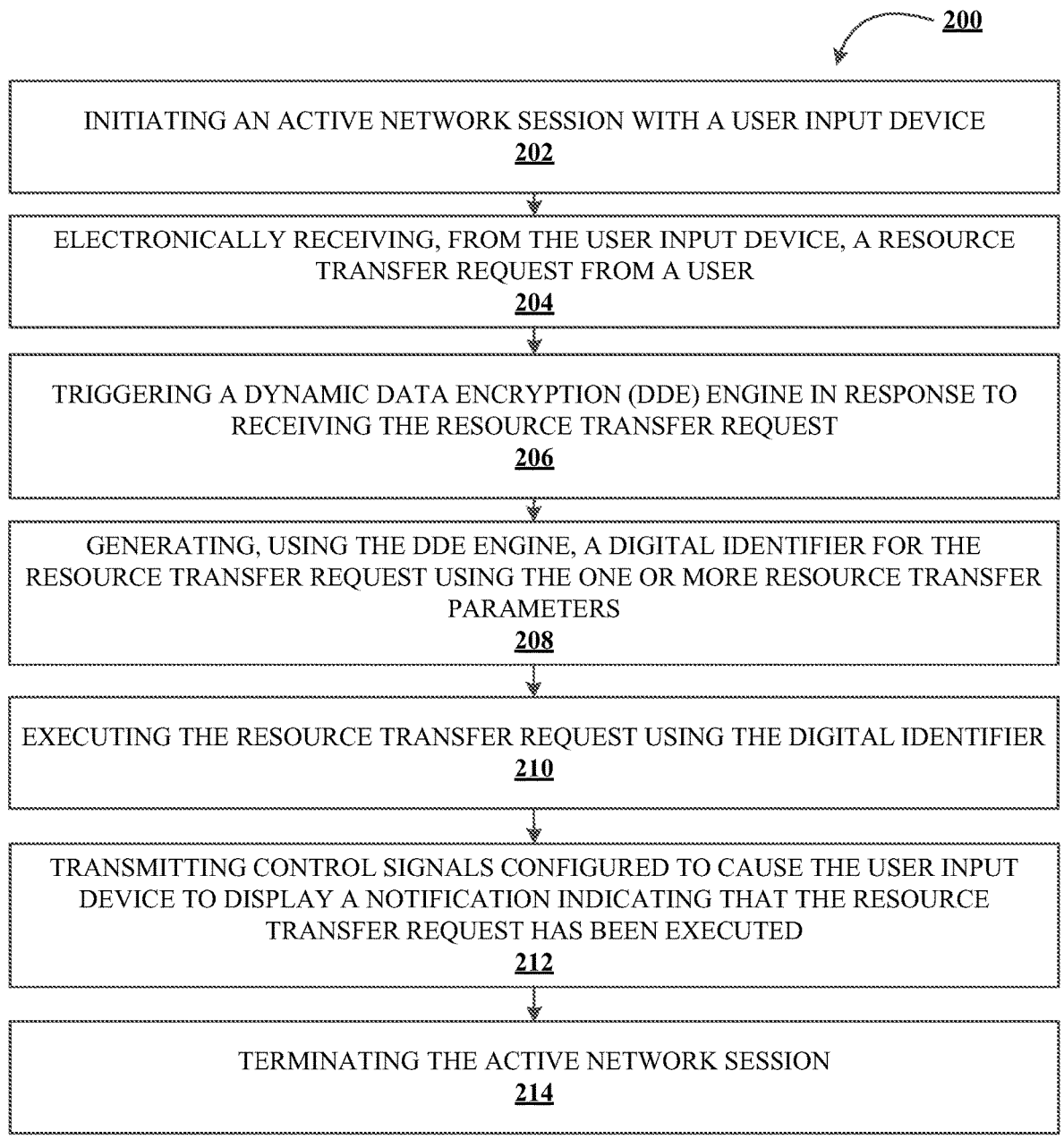

Having thus described embodiments of the invention in general terms, reference will now be made the accompanying drawings, wherein:

FIGS. 1A-1C illustrates technical components of an exemplary distributed computing environment for dynamic data encryption in an active network session, in accordance with an embodiment of the invention;

FIG. 2 illustrates a process flow for dynamic data encryption in an active network session, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

There may be multiple parties involved in the execution of a resource transfer, such as a person or entity that requests resources (e.g., user), a person or entity that provides the resources (e.g., merchant), a payment reconciliation entity that ensures transfer of payment for the resources provided, and/or the like. Each party may require particular information to aid in the execution of the resource transfer request. For example, the merchant may require specific information about the resources that need to transfer, and the payment reconciliation entity may require payment information to be used to execute the resource transfer request. This information is provided by the user in the form of resource transfer parameters when initiating the resource transfer request. However, not all elements of the resource transfer parameters are required by all the partied involved. Due to the sensitive nature of the information provided, e.g., payment instrument information, divulging such information when not required may increase the exposure to misappropriation. Accordingly, the present invention uses a dynamic data encryption (DDE) engine to generate a digital identifier that is a concatenated string of individual hash digests that may be used to represent the resource transfer request in its totality. When executing the resource transfers, the present invention extracts specific portions of the digital identifier to be decrypted and transmitted to the relevant parties for execution.

Accordingly, the present invention, (i) Receives, from the user input device, a resource transfer request (transaction request) from a user. When submitting a request to transfer resources, the user may also provide resource transfer parameters that identify the particular resources involved, the third party involved, the payment information to be used, a network session identifier, and a resource transfer identifier, (ii) Triggers a dynamic data encryption (DDE) engine in response to receiving the resource transfer request. The DDE engine may be deployable on a cloud server and as a centralized distributed system may be capable of providing open application programming interface (API) services for the many parties involved in the transfer of resources. The user may be required to complete a DDE registration request with the entity prior to being eligible to have the option to use the DDE engine. The user may be able to trigger the DDE engine during the active network session, (iii) Initiates an authentication protocol to validate an identity of the user and determine whether the user is eligible to use the DDE engine, (iv) Generates, using the DDE engine, a digital identifier for the resource transfer request using the one or more resource transfer parameters. The digital identifier may be a unique identifier that exclusively identifies the resource transfer request. Hash each resource transfer parameter individually using a hash function to generate a hash digest. Concatenate the hash digests using predetermined positioning factors to generate the digital identifier, (v) Executes the resource transfer request using the digital identifier. Extracts specific portions of the digital identifier to be decrypted and transmitted to the relevant parties for execution by providing an open application programming interface (API) service, (vi) Displays a notification on the user input device indicating that the resource transfer request has been executed.

What is more, the present invention provides a technical solution to a technical problem. The technical solution presented herein allows for protection of sensitive information by generating a digital identifier that is a concatenated string of individual hash digests that may be used to represent the resource transfer request in its totality. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for dynamic data encryption in an active network session 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, payment reconciliation devices, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for dynamic data encryption in an active network session 200, in accordance with an embodiment of the invention. As shown in block 202, the process flow includes initiating an active network session with a user input device. In some embodiments, an active network session may be a time-delimited two-way link, a practical (relatively high) layer in the TCP/IP protocol enabling interactive expression and information exchange between two or more communication devices or ends.

Next, as shown in block 204, the process flow includes electronically receiving, from the user input device, a resource transfer request from a user. In some embodiments, a resource transfer request may be a request to transfer or exchange resources between the user and a third party. In a peer-to-peer (P2P) transfer, this third party may be another user or entity. In a merchant-user transfer, the third party may be a merchant. When submitting a request to transfer resources, the user may also provide particular resource transfer parameters that specify transfer-specific information that may be used to identify the particular resources involved, the third party involved, the payment information to be used, and/or the like. In addition, the resource transfer parameters may also include a network session identifier that identifies the active network session during which the user has requested the transfer of resources, and a resource transfer identifier that uniquely identifies the particular resource transfer request.

Next, as shown in block 206, the process flow includes triggering a dynamic data encryption (DDE) engine in response to receiving the resource transfer request. In some embodiments, the DDE engine may be deployable on a cloud server and as a centralized distributed system may be capable of providing open application programming interface (API) services for the many parties involved in the transfer of resources.

In some embodiments, the user may be required to complete a DDE registration request with the entity prior to being eligible to have the option to use the DDE engine to execute the resource transfer request. Thus, the DDE registration allows the user the option of having any information being provided by the user during the execution of resource transfers to be protected from misappropriation. For successful registration, the user may be required to provide user-specific information, such as personal information, payment instrument information, and user preferences that indicate the conditions for use of the DDE engine. In one example, the user preference may indicate that the user may wish to automatically trigger the DDE engine if the user has indicated, in the resource transfer request, the use of a specific payment instrument. In this way, the user may wish to protect that particular payment instrument from misappropriation. In another example, the user preference may indicate that the user may wish to be provided with the option to manually trigger the DDE engine each time the user attempts to execute a resource transfer request. In response to receiving and subsequently processing the user-specific information, the system may be configured to register the user.

In some embodiments, the user may be able to trigger the DDE engine during the active network session. In response, the system may be configured to initiate an authentication protocol to validate an identity of the user and determine whether the user is eligible to use the DDE engine, i.e., if the user has previously registered with the entity to have that capability. Accordingly, the system may be configured to prompt the user to provide authentication credentials. These authentication credentials may then be used to verify whether the user is previously registered to use the DDE engine, and whether the user is indeed who they say they are. On successful verification and validation, the system may be configured to trigger the DDE engine.

Next, as shown in block 208, the process flow includes generating, using the DDE engine, a digital identifier for the resource transfer request using the one or more resource transfer parameters. In some embodiments, the digital identifier may be a unique identifier that exclusively identifies the resource transfer request. As described herein, each resource transfer request may include resource transfer parameters such as a network session identifier, a resource transfer identifier, user information, merchant information, one or more resources, payment information, and/or the like. To generate the digital identifier for the resource transfer request, the DDE engine may be configured to hash each resource transfer parameter individually using a hash function. A hash function is any algorithm that maps the data of a variable length into a data of fixed length. The resulting value returned may be referred to as hash digest. Accordingly, each resource transfer parameter may be hashed individually to generate a hash digest. The resource transfer parameter and the corresponding hash digest may then be stored in a lookup table in a hash database for future retrieval. Once generated, these hash digests are concatenated using predetermined positioning factors to generate the digital identifier. In one aspect, the positioning factors determine the order of concatenation of each hash digest.

Next, as shown in block 210, the process flow includes executing the resource transfer request using the digital identifier. In some embodiments, the system may be configured to use the digital identifier to execute the resource transfer request. As described herein, the digital identifier may be a concatenated string of individual hash digests that may be used to represent the resource transfer request in its totality. When executing the resource transfers, the system may be configured to extract specific portions of the digital identifier to be decrypted and transmitted to the relevant parties for execution.

Accordingly, the system may be configured to decrypt the digital identifier to extract a first portion of the resource transfer parameters. In some embodiments, the first portion of the resource transfer parameters may specify the resources requested by the user. Decrypting the digital identifier may include reverse lookup (unhash; decryption) using the hash database that stores a lookup table. As described herein, the lookup table may include the hash digest and the corresponding resource transfer parameter. Once extracted the first portion of the resource transfer parameters may be used by a merchant to execute the resource transfer. To this end, the system may be configured to provide an open application programming interface (API) service with the merchant input device to transmit the first portion of the resource transfer parameters to the merchant.

The merchant may then use the first portion of the resource transfer parameters to execute the resource transfer request. In response, the system may be configured receive, from the merchant input device, an indication that the one or more resources associated with the resource transfer request has been transferred to the user.

Similarly, the system may be configured to decrypt the digital identifier to extract a second portion of the resource transfer parameters. In some embodiments, the second portion of the one or more resource transfer parameters comprises payment information required by a payment reconciliation entity to complete payment processing and settlement. Once extracted the second portion of the resource transfer parameters may be used by a payment reconciliation entity to complete payment processing and settlement in the back-end. To this end, the system may be configured to provide an open application programming interface (API) service with the payment reconciliation entity to transmit the second portion of the resource transfer parameters to the merchant. The payment reconciliation entity may then use this information to complete payment processing and settlement. In response, the system may be configured to receive, from the payment reconciliation entity, an indication that the payment processing and reconciliation has been completed.

Next, as shown in block 212, the process flow includes transmitting control signals configured to cause the user input device to display a notification indicating that the resource transfer request has been executed. Next, as shown in block 214, the process flow includes terminating the active network session.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, a computer-implemented process is thus produced, such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamic data encryption in an active network session, the system comprising:
   at least one non-transitory storage device; and
   at least one processor coupled to the at least one non-transitory storage device, wherein the at least one processor is configured to:
   initiate an active network session with a user input device;
   electronically receive, from the user input device, a resource transfer request from a user, wherein the resource transfer request comprises at least resource transfer parameters;
   trigger a dynamic data encryption (DDE) engine in response to receiving the resource transfer request;
   encrypt, using the DDE engine, the resource transfer request using the resource transfer parameters, wherein encrypting further comprises generating a digital identifier for the resource transfer request by:
      individually hashing each resource transfer parameter using a hash function to create corresponding hash digests;
      concatenating the hash digests in a predetermined sequence to form the digital identifier; and
      associating the digital identifier with the corresponding resource transfer request;
   determine a plurality of entities associated with execution of specific portions of the resource transfer request;
   determine a corresponding plurality of resource transfer parameters required by the plurality of entities to execute the specific portions of the resource transfer request;
   decrypt the digital identifier to extract the plurality of resource transfer parameters from the digital identifier;
   transmit the extracted plurality of resource transfer parameters to the corresponding plurality of entities;
   receive, from the plurality of entities, indications that the specific portions of the resource transfer request have been executed;
   transmit control signals configured to cause the user input device to display a notification indicating that the resource transfer request has been executed; and
   terminate the active network session.

2. The system of claim 1, wherein the at least one processor is further configured to:
   electronically receive, from the user input device, a DDE registration request to use the DDE engine to execute one or more resource transfers;
   transmit control signals configured to cause the user input device to display a prompt to provide one or more user information in response to receiving the DDE registration request;
   receive, from the user input device, the one or more user information in response to the prompt; and
   register the user using the one or more user information.

3. The system of claim 2, wherein the at least one processor is further configured to:
   electronically receive, from the user input device, a request to trigger the DDE engine to execute the resource transfer request;
   prompt the user to provide one or more authentication credentials in response to receiving the request;

electronically receive, from the user input device, the one or more authentication credentials in response to the prompt;
determine that the user is registered to use the DDE engine to execute the one or more resource transfers; and
trigger the DDE engine in response to determining that the user is registered to use the DDE engine.

4. The system of claim 1, wherein the resource transfer parameters comprises at least a network session identifier, a resource transfer identifier, user information, merchant information, one or more resources, and payment information.

5. The system of claim 4, wherein the at least one processor is further configured to:
decrypt the digital identifier to extract a first portion of the resource transfer parameters, wherein the first portion of the resource transfer parameters comprises information required by a merchant to transfer the one or more resources associated with the resource transfer request to the user;
transmit the first portion of the resource transfer parameters to a merchant input device associated with the merchant; and
receive, from the merchant input device, an indication that the one or more resources associated with the resource transfer request has been transferred to the user.

6. The system of claim 4, wherein the at least one processor is further configured to:
decrypt the digital identifier to extract a second portion of the resource transfer parameters, wherein the second portion of the resource transfer parameters comprises payment information required by a payment reconciliation entity to complete payment processing and settlement;
transmit the second portion of the resource transfer parameters to a payment reconciliation device associated with the payment reconciliation entity; and
receive, from the payment reconciliation entity, an indication that the payment processing and reconciliation has been completed.

7. The system of claim 1, wherein the digital identifier is unique to the resource transfer request.

8. A computer program product for dynamic data encryption in an active network session, the computer program product comprising a non-transitory computer-readable medium comprising code causing an apparatus to:
initiate an active network session with a user input device;
electronically receive, from the user input device, a resource transfer request from a user, wherein the resource transfer request comprises at least one or more resource transfer parameters;
trigger a dynamic data encryption (DDE) engine in response to receiving the resource transfer request;
encrypt, using the DDE engine, the resource transfer request using the resource transfer parameters, wherein encrypting further comprises generating a digital identifier for the resource transfer request by:
individually hashing each resource transfer parameter using a hash function to create corresponding hash digests;
concatenating the hash digests in a predetermined sequence to form the digital identifier; and
associating the digital identifier with the corresponding resource transfer request;
determine a plurality of entities associated with execution of specific portions of the resource transfer request;
determine a corresponding plurality of resource transfer parameters required by the plurality of entities to execute the specific portions of the resource transfer request;
decrypt the digital identifier to extract the plurality of resource transfer parameters from the digital identifier;
transmit the extracted plurality of resource transfer parameters to the corresponding plurality of entities;
receive, from the plurality of entities, indications that the specific portions of the resource transfer request have been executed;
transmit control signals configured to cause the user input device to display a notification indicating that the resource transfer request has been executed; and
terminate the active network session.

9. The computer program product of claim 8, wherein the apparatus is further configured to:
electronically receive, from the user input device, a DDE registration request to use the DDE engine to execute one or more resource transfers;
transmit control signals configured to cause the user input device to display a prompt to provide one or more user information in response to receiving the DDE registration request;
receive, from the user input device, the one or more user information in response to the prompt; and
register the user using the one or more user information.

10. The computer program product of claim 9, wherein the apparatus is further configured to:
electronically receive, from the user input device, a request to trigger the DDE engine to execute the resource transfer request;
prompt the user to provide one or more authentication credentials in response to receiving the request;
electronically receive, from the user input device, the one or more authentication credentials in response to the prompt;
determine that the user is registered to use the DDE engine to execute the one or more resource transfers; and
trigger the DDE engine in response to determining that the user is registered to use the DDE engine.

11. The computer program product of claim 9, wherein the resource transfer parameters comprises at least a network session identifier, a resource transfer identifier, user information, merchant information, one or more resources, and payment information.

12. The computer program product of claim 11, wherein the apparatus is further configured to:
decrypt the digital identifier to extract a first portion of the resource transfer parameters, wherein the first portion of the resource transfer parameters comprises information required by a merchant to transfer the one or more resources associated with the resource transfer request to the user;
transmit the first portion of the resource transfer parameters to a merchant input device associated with the merchant; and
receive, from the merchant input device, an indication that the one or more resources associated with the resource transfer request has been transferred to the user.

13. The computer program product of claim 11, wherein the apparatus is further configured to:
decrypt the digital identifier to extract a second portion of the resource transfer parameters, wherein the second portion of the resource transfer parameters comprises payment information required by a payment reconciliation entity to complete payment processing and settlement;

transmit the second portion of the resource transfer parameters to a payment reconciliation device associated with the payment reconciliation entity; and receive, from the payment reconciliation entity, an indication that the payment processing and reconciliation has been completed.

14. The computer program product of claim 9, wherein the digital identifier is unique to the resource transfer request.

15. A method for dynamic data encryption in an active network session, the method comprising:

initiating an active network session with a user input device;

electronically receiving, from the user input device, a resource transfer request from a user, wherein the resource transfer request comprises at least one or more resource transfer parameters;

triggering a dynamic data encryption (DDE) engine in response to receiving the resource transfer request;

encrypting, using the DDE engine, the resource transfer request using the one or more resource transfer parameters, wherein encrypting further comprises generating a digital identifier for the resource transfer request by:
  individually hashing each resource transfer parameter using a hash function to create corresponding hash digests;
  concatenating the hash digests in a predetermined sequence to form the digital identifier; and
  associating the digital identifier with the corresponding resource transfer request;

determining a plurality of entities associated with the execution of specific portions of the resource transfer request;

determining a corresponding plurality of resource transfer parameters required by the plurality of entities to execute the specific portions of the resource transfer request;

decrypting the digital identifier to extract the plurality of resource transfer parameters from the digital identifier;

transmitting the extracted plurality of resource transfer parameters to the corresponding plurality of entities;

receiving, from the plurality of entities, indications that the specific portions of the resource transfer request have been executed;

transmitting control signals configured to cause the user input device to display a notification indicating that the resource transfer request has been executed; and terminating the active network session.

16. The method of claim 15, wherein the method further comprises:

electronically receiving, from the user input device, a DDE registration request to use the DDE engine to execute one or more resource transfers;

transmitting control signals configured to cause the user input device to display a prompt to provide one or more user information in response to receiving the DDE registration request;

receiving, from the user input device, the one or more user information in response to the prompt; and registering the user using the one or more user information.

17. The method of claim 15, wherein the method further comprises:

electronically receiving, from the user input device, a request to trigger the DDE engine to execute the resource transfer request;

prompting the user to provide one or more authentication credentials in response to receiving the request;

electronically receiving, from the user input device, the one or more authentication credentials in response to the prompt;

determining that the user is registered to use the DDE engine to execute the one or more resource transfers; and triggering the DDE engine in response to determining that the user is registered to use the DDE engine.

18. The method of claim 15, wherein the resource transfer parameters comprises at least a network session identifier, a resource transfer identifier, user information, merchant information, one or more resources, and payment information.

19. The method of claim 18, wherein the method further comprises:

decrypting the digital identifier to extract a first portion of the resource transfer parameters, wherein the first portion of the resource transfer parameters comprises information required by a merchant to transfer the one or more resources associated with the resource transfer request to the user;

transmitting the first portion of the resource transfer parameters to a merchant input device associated with the merchant; and receiving, from the merchant input device, an indication that the one or more resources associated with the resource transfer request has been transferred to the user.

20. The method of claim 18, wherein the method further comprises:

decrypting the digital identifier to extract a second portion of the resource transfer parameters, wherein the second portion of the resource transfer parameters comprises payment information required by a payment reconciliation entity to complete payment processing and settlement;

transmitting the second portion of the resource transfer parameters to a payment reconciliation device associated with the payment reconciliation entity; and receiving, from the payment reconciliation entity, an indication that the payment processing and reconciliation has been completed.

* * * * *